United States Patent
Kang et al.

(10) Patent No.: US 12,177,447 B2
(45) Date of Patent: Dec. 24, 2024

(54) METHOD AND DEVICE FOR EFFICIENTLY APPLYING TRANSFORM SKIP MODE TO DATA BLOCK

(71) Applicants: Hyundai Motor Company, Seoul (KR); Kia Motors Corporation, Seoul (KR); Ewha University—Industry Collaboration Foundation, Seoul (KR)

(72) Inventors: Je Won Kang, Seoul (KR); Sang Hyo Park, Seoul (KR); Seung Wook Park, Gyeonggi-do (KR); Wha Pyeong Lim, Gyeonggi-do (KR)

(73) Assignees: Hyundai Motor Company, Seoul (KR); Kia Motors Corporation, Seoul (KR); Ewha University-Industry Collaboration Foundation, Seoul (KR)

( * ) Notice: Subject to any disclaimer, the term of this patent is extended or adjusted under 35 U.S.C. 154(b) by 247 days.

(21) Appl. No.: 17/438,626

(22) PCT Filed: Mar. 13, 2020

(86) PCT No.: PCT/KR2020/003496
§ 371 (c)(1),
(2) Date: Sep. 13, 2021

(87) PCT Pub. No.: WO2020/185027
PCT Pub. Date: Sep. 17, 2020

(65) Prior Publication Data
US 2022/0295068 A1 Sep. 15, 2022

(30) Foreign Application Priority Data
Mar. 13, 2019 (KR) .................. 10-2019-0028994

(51) Int. Cl.
*H04N 19/132* (2014.01)
*H04N 19/119* (2014.01)
(Continued)

(52) U.S. Cl.
CPC ......... *H04N 19/132* (2014.11); *H04N 19/119* (2014.11); *H04N 19/176* (2014.11);
(Continued)

(58) Field of Classification Search
CPC .. H04N 19/132; H04N 19/119; H04N 19/176; H04N 19/186; H04N 19/61;
(Continued)

(56) References Cited

U.S. PATENT DOCUMENTS

2014/0226721 A1\* 8/2014 Joshi ............... H04N 19/176
                                                         375/240.12
2016/0286096 A1\* 9/2016 Satomi ............ H04N 19/132
(Continued)

FOREIGN PATENT DOCUMENTS

| GB | 2492333 A | \* | 1/2013 | ............. H04N 19/12 |
| KR | 10-2018-0001485 A | | 1/2018 | |
| KR | 10-2018-0085528 A | | 7/2018 | |

OTHER PUBLICATIONS

S. D-L-Hernandez et al., "CE3: Intra Sub-Partitions Coding Mode (Tests 1.1.1 and 1.1.2)", Joint Video Experts Team (JVET), 13th Meeting: Marrakech, MA Jan. 9-18, 2019.
(Continued)

*Primary Examiner* — Boubacar Abdou Tchoussou
(74) *Attorney, Agent, or Firm* — Fox Rothschild LLP

(57) ABSTRACT

Disclosed are a method and an apparatus for efficiently applying a transform skip mode to a transform block. According to an embodiment of the present invention, a video decoding apparatus determines, based on transform skip information associated with a current block, the transform skip information being decoded from a bitstream, whether a subblock for which transform is skipped and one or more subblocks to which transform is applied are included in the current block. When determining that the
(Continued)

current block includes the subblock for which the transform is skipped and the one or more subblocks to which the transform is applied are included in the current block, the video decoding apparatus decodes a first residual subblock using a decoding procedure not involving inverse transform for the subblock for which the transform is skipped, and decodes one or more second residual subblocks using a decoding procedure involving the inverse transform for the one or more subblocks to which the transform is applied. The video decoding apparatus adds the first residual subblock and the one or more second residual subblocks to a prediction block to reconstruct the current block. Representative drawing: FIGS. 5A-5D

8 Claims, 9 Drawing Sheets

(51) Int. Cl.
  *H04N 19/176* (2014.01)
  *H04N 19/186* (2014.01)
  *H04N 19/61* (2014.01)
  *H04N 19/70* (2014.01)
(52) U.S. Cl.
  CPC ........... *H04N 19/186* (2014.11); *H04N 19/61* (2014.11); *H04N 19/70* (2014.11)

(58) Field of Classification Search
  CPC ...... H04N 19/70; H04N 19/159; H04N 19/12; H04N 19/625
  See application file for complete search history.

(56) References Cited

U.S. PATENT DOCUMENTS

| | | |
|---|---|---|
| 2019/0215516 A1 | 7/2019 | Lim et al. |
| 2020/0204833 A1* | 6/2020 | Egilmez ................. H04N 19/96 |
| 2020/0260070 A1* | 8/2020 | Yoo ........................ H04N 19/70 |
| 2021/0297701 A1* | 9/2021 | Tsukuba ............... H04N 19/124 |
| 2021/0306666 A1* | 9/2021 | Lee ...................... H04N 19/105 |

OTHER PUBLICATIONS

X. Zhao et al., "CE6 related: Unification of transform Skip mode and MTS", Joint Video Experts Team (JVET), 13th Meeting: Marrakech, MA, Jan. 9-18, 2019.

B. Bross et al., "Non-CE8: Unified Transform Type Signalling and Residual Coding for Transform Skip", Joint Video Experts Team (JVET), 13th Meeting: Marrakech, MA, Jan. 9-18, 2019.

* cited by examiner

METHOD AND DEVICE FOR EFFICIENTLY APPLYING TRANSFORM SKIP MODE TO DATA BLOCK

CROSS-REFERENCE TO RELATED APPLICATION

This application is a National Phase filed under 35 USC 371 of PCT International Application No. PCT/KR2020/003496 filed Mar. 13, 2020, which claims priority from Korean Patent Application No. 10-2019-0028994 filed on Mar. 13, 2019, the disclosure of which is incorporated by reference herein in its entirety.

TECHNICAL FIELD

The present disclosure relates to encoding and decoding of a video data, more particularly, relates to a technique for improving coding efficiency by efficiently applying a transform skip mode to a block of the video data.

BACKGROUND

The statements in this section merely provide background information related to the present disclosure and do not necessarily constitute prior art.

Since video data has a large data volume compared to audio data or still image data, it requires a lot of hardware resources, including memory, to store or transmit the data in its raw form before undergoing a compression process.

Accordingly, storing or transmitting video data typically accompanies compression thereof by using an encoder before a decoder can receive, decompress, and reproduce the compressed video data. Existing video compression technologies include H.264/AVC and High Efficiency Video Coding (HEVC), which improves the encoding efficiency of H.264/AVC by about 40%.

However, the constant increase of video images in size, resolution, and frame rate and the resultant increase of data amount to be encoded require a new and superior compression technique with better encoding efficiency and higher image quality improvement over existing compression techniques.

SUMMARY

Technical Problem

In a conventional coding operation, a residual block is transformed to transform sample data included in the residual block into a frequency representation. For example, in the case of blocks having highly variable graphic content, coding efficiency may be improved by skipping the transform operation. In general, the present disclosure intends to provide a transform/transform skip technique capable of providing flexibility to the application range of a transform skip mode.

Technical Solution

According to one aspect of the present disclosure, a method for decoding video data comprises decoding transform skip information related to associated with a current block from a bitstream, and determining, based on the transform skip information, whether a subblock for which transform is skipped and one or more subblocks to which transform is applied are included in the current block. The method further comprises, when it is determined that the current block includes the subblock for which the transform is skipped and the one or more subblocks to which the transform is applied are included in the current block, decoding a first residual subblock using a decoding procedure not involving inverse transform for the subblock for which the transform is skipped, and decoding one or more second residual subblocks using a decoding procedure involving the inverse transform for the one or more subblocks to which the transform is applied. The method further comprises adding the first residual subblock and the one or more second residual subblocks to a prediction block to reconstruct the current block.

According to other aspect of the present disclosure, an apparatus for decoding a video data comprises a means for decoding transform skip information associated with a current block from a bitstream, and a means determining, based on the transform skip information, whether a subblock for which transform is skipped and one or more subblocks to which transform is applied are included in the current block. The apparatus further comprises a means for performing, when it is determined that the current block includes the subblock for which the transform is skipped and the one or more subblocks to which the transform is applied are included in the current block, decoding a first residual subblock using a decoding procedure not involving inverse transform the subblock for which the transform is skipped, and decoding one or more second residual subblocks using a decoding procedure involving the inverse transform for the one or more subblocks to which the transform is applied. The apparatus further comprises a means for adding the first residual subblock and the one or more second residual subblocks to a prediction block to reconstruct the current block.

DETAILED DESCRIPTION

Figure 1:
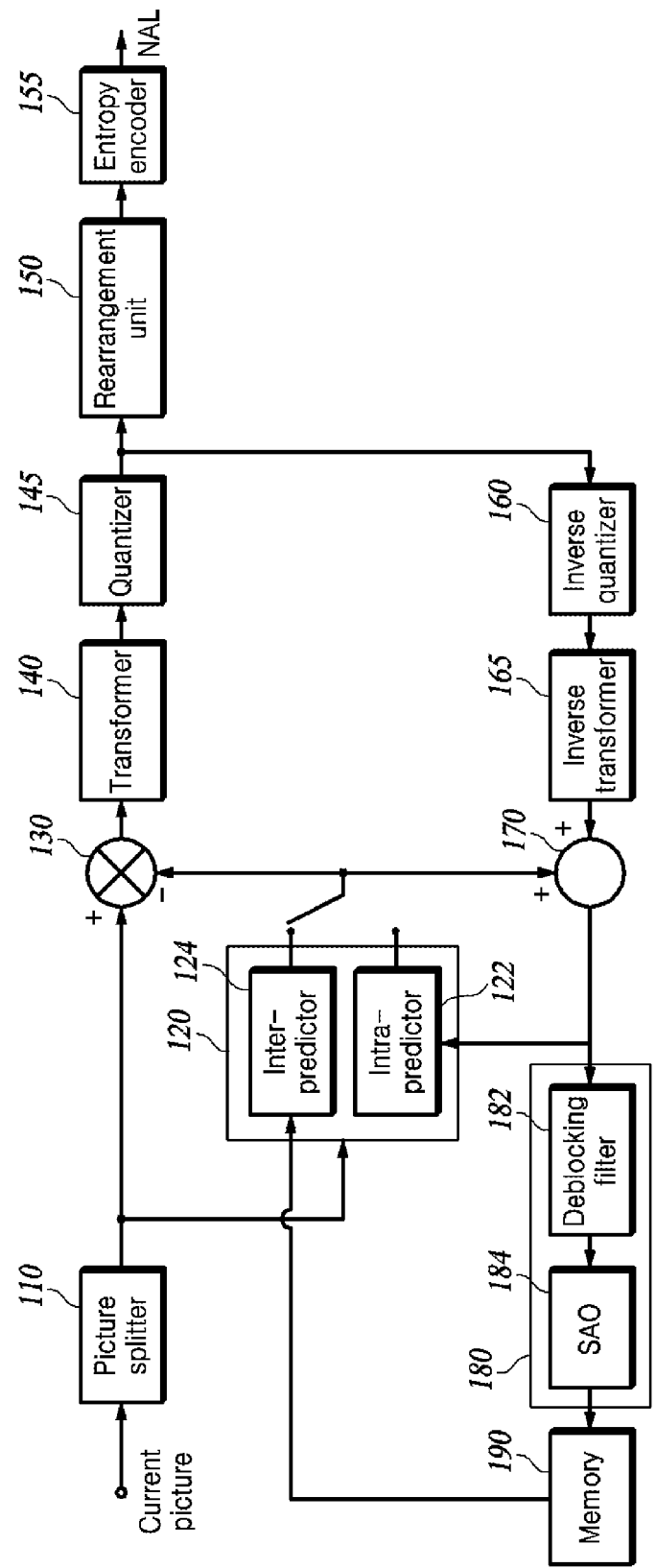
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
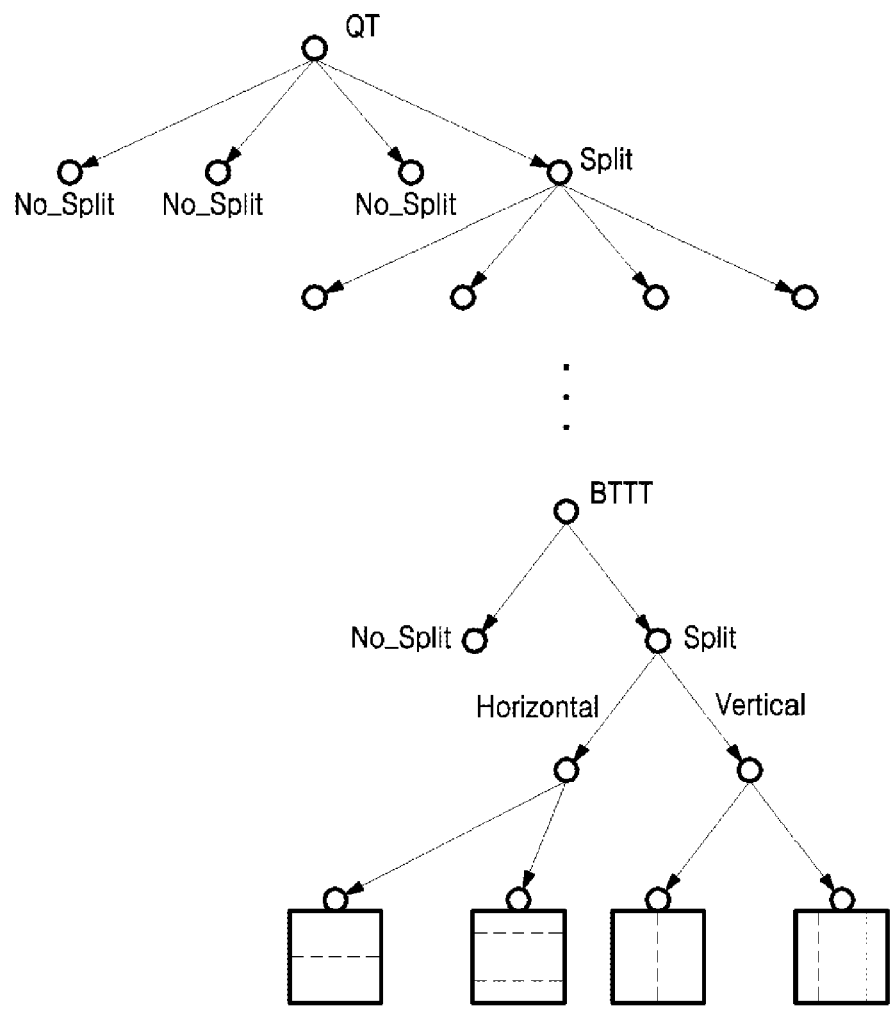
FIG. 2 exemplarily shows a block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124. The predictor 120 may include an additional functional unit to perform video prediction according to different prediction modes. For example, the predictor 120 may further include a palette unit, an intra-block copy unit, and an affine unit.

In general, each of the current blocks in a picture may be predictively coded. In general, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
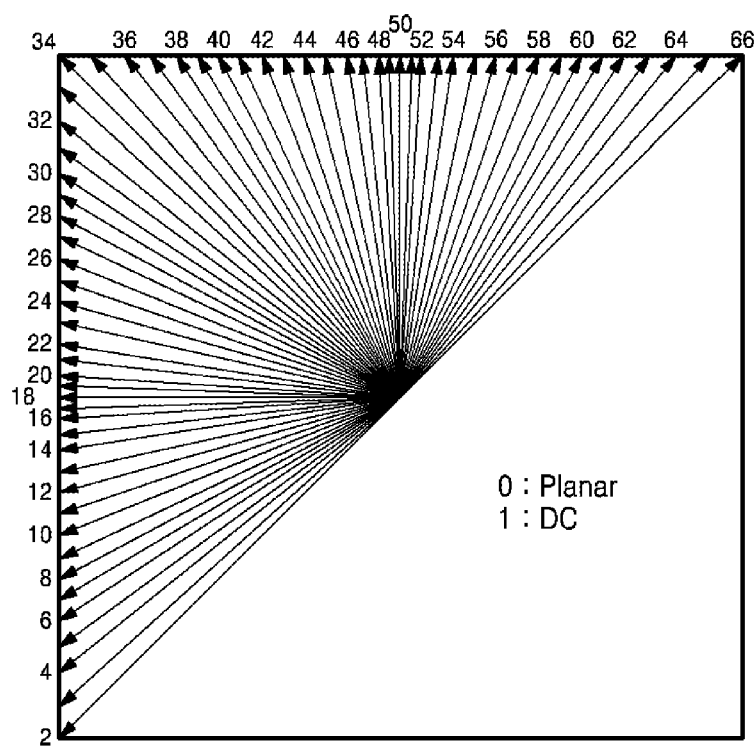
FIG. 3A shows a plurality of intra-prediction modes.

The intra-predictor 122 predicts pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a PLANAR mode and a DC mode, and 65 directional modes. Neighboring pixels and an equation to be used are defined differently for each prediction mode.

Figure 3B:
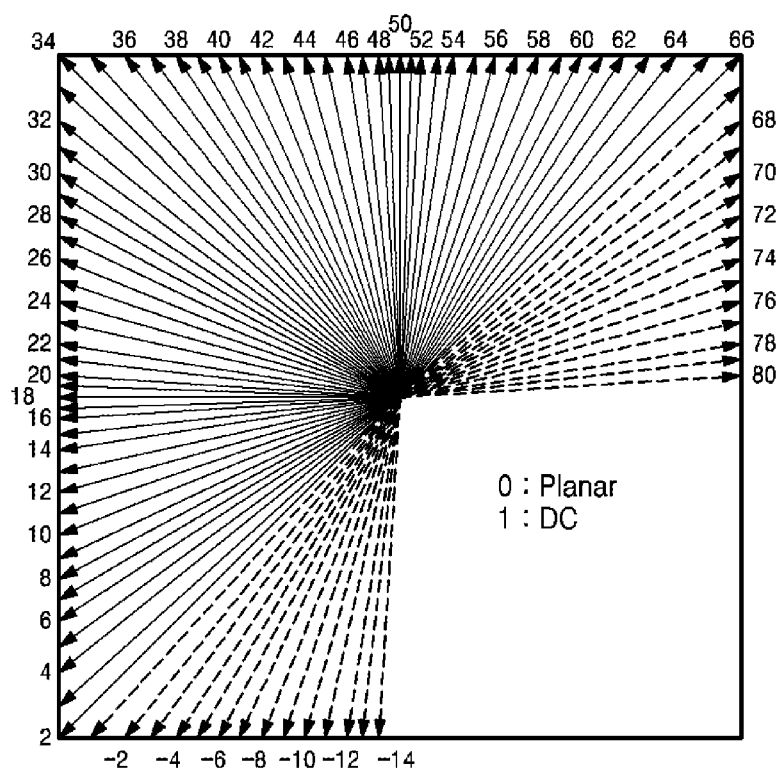
FIG. 3B shows a plurality of intra-prediction modes including wide-angle intra-pre diction modes.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of the width and height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with height greater than the width thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture which has been encoded and decoded earlier than the current picture, and generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 subtracts the prediction block generated by the intra-predictor 122 or the inter-predictor 124 from the current block to generate a residual block.

The transformer 140 transforms the residual signal in the residual block having pixel values in the spatial domain into transform coefficients in the frequency domain. The transformer 140 may transform the residual signals in the residual block by using the full size of the residual block as a transform unit, or separate the residual block into two subblocks that are a transform region and a non-transform region and transform the residual signals by using the transform-region subblock alone as a transform unit. Here, the transform-region subblock may be one of two rectangular blocks having a size ratio of 1:1 in the horizontal axis (or vertical axis). In this case, the flag (cu_sbt_flag) indicating that only a single subblock is transformed, directional (vertical/horizontal) information (cu_sbt_horizontal_flag), and/or position information (cu_sbt_pos_flag) are encoded by the entropy encoder 155 and signaled to the video decoding apparatus. Additionally, the size of the transform-region subblock may have a size ratio of 1:3 in the horizontal axis (or vertical axis). In this case, a flag (cu_sbt_quad_flag) distinguishing the corresponding splitting is additionally encoded by the entropy encoder 155 and signaled to the video decoding apparatus.

Meanwhile, a maximum and/or minimum transform size may be defined for a transform. A transform is disallowed from using a transform unit with a size smaller than the minimum transform size. Additionally, when the residual block of the current block is larger than the maximum transform size, the transformer 140 splits the residual block into subblocks having a size equal to or less than the maximum transform size and performs the transform by using the subblocks as transform units. Here, the maximum and/or minimum transform size may be defined as a fixed size arranged between the video encoding apparatus and the video decoding apparatus. Alternatively, information on the maximum and/or minimum transform size may be included in the SPS or the PPS and signaled from the video encoding apparatus to the video decoding apparatus.

The quantizer 145 quantizes transform coefficients output from the transformer 140, and outputs the quantized transform coefficients to the entropy encoder 155. The quantization process may reduce the bit depth related to the coefficients. The degree of quantization may be changed by adjusting the quantization parameter.

The rearrangement unit 150 may reorganize the coefficient values for the quantized residual value.

The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 encodes the one-dimensional quantized transform coefficients output from the rearrangement unit 150 using uses various encoding techniques such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (information about a reference picture index and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184.

The deblocking filter 180 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
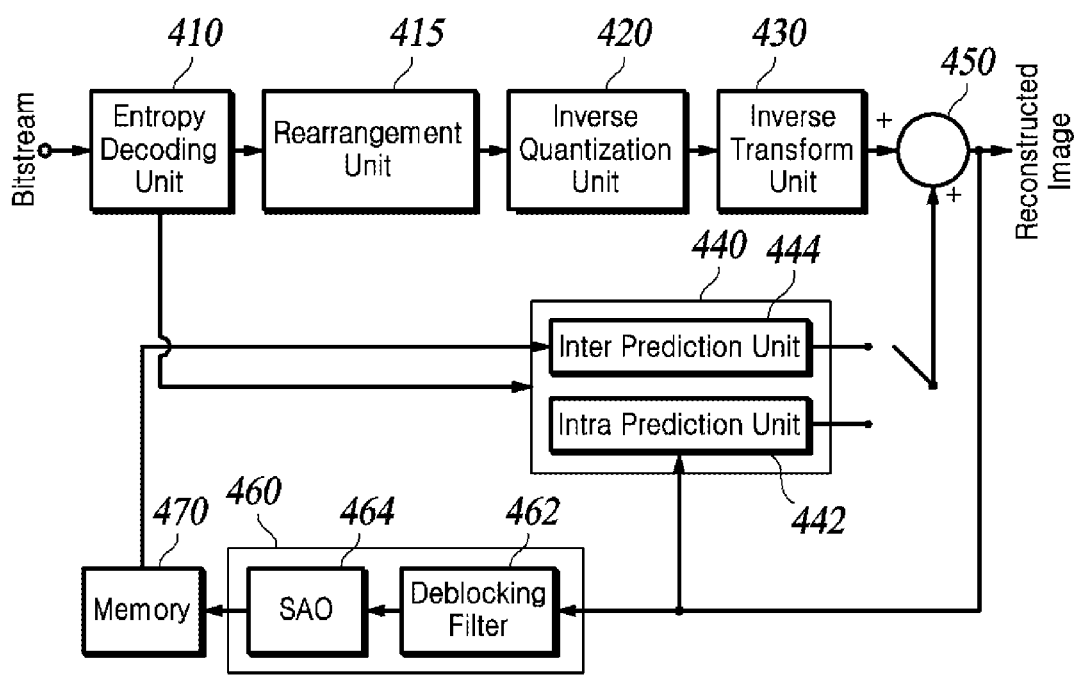
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting, and extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, that is, information indicating a motion vector and a reference picture referred to by the motion vector.

The entropy decoder 410 extracts information about quantized transform coefficients of the current block as information about the residual signal.

The rearrangement unit 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 inversely quantizes the quantized transform coefficients. The inverse transformer 430 inversely transforms the inversely quantized transform coefficients from the frequency domain to the spatial domain to reconstruct residual signals, thereby generating a residual block for the current block.

Additionally, when the inverse transformer 430 inversely transforms only a partial region (subblock) of the transform block, it extracts a flag (cu_sbt_flag) indicating that only the subblock of the transform block has been transformed, the subblock's directionality (vertical/horizontal) information (cu_sbt_horizontal_flag), and/or subblock's position information (cu_sbt_pos_flag), and inversely transforms the transform coefficients of the subblock from the frequency domain to the spatial domain to reconstruct the residual signals. At the same time, the inverse transformer 430 fills the remaining region which is not inversely transformed with the "0" value as the residual signals, and thereby generates the final residual block for the current block. Meanwhile, no transform is allowed when using a transform unit with a size smaller than the minimum transform size. Additionally, when the residual block of the current block is larger than the maximum transform size, the inverse transformer 430 splits the residual block into subblocks having a size equal to or less than the maximum transform size and performs the inverse transform by using the subblocks as transform units.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410, and predicts the current block using the reference pixels around the current block according to the intra-prediction mode. The intra-prediction mode determined by the syntax element for the intra-prediction mode may be a value indicating one of all intra-prediction modes (e.g., a total of 67 modes) as described above. In a case where the current block is rectangular, some directional modes among the total of 67 modes may be replaced with one of the wide-angle intra-prediction modes based on the ratio of the width to the height of the current block.

The inter-predictor 444 determines a motion vector of the current block and a reference picture referred to by the motion vector using the syntax element for the intra-prediction mode extracted from the entropy decoder 410, and predicts the current block based on the motion vector and the reference picture.

The adder 450 reconstructs the current block by adding the residual block output from the inverse transformer and the prediction block output from the inter-predictor or the intra-predictor. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 performs additional filtering on the reconstructed block after deblocking filtering to corresponding offsets so as to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

The techniques of the present disclosure generally relate to transforming a residual block. Accordingly, certain techniques of the present disclosure may be mainly carried out by the transformer 140 or the inverse transformer 430. For example, the transformer 140 or the inverse transformer 430 may carry out the techniques of the present disclosure described below with reference to FIGS. 5 to 8. In other examples, one or more other units of the video encoding apparatus or the video decoding apparatus may be additionally involved in carrying out the techniques of the present disclosure. The following description mainly focuses on the decoding technique, that is, the operation of the video decoding apparatus, and the description of the encoding technique is provided in brief because it is the reverse of the decoding technique that is comprehensively described herein.

In general, a block of video data may be coded without a transform operation, called "transform skip (TS)", and it is indicated by a syntax element transform skip flag. When transform_skip_flag is 1, an associated block of video data is coded in the transform skip mode. Otherwise, the transformation is applied to the associated block of video data.

In the transform skip mode, quantization and entropy encoding are performed in the pixel domain without transforming the residual signals into the frequency domain. The transform skip mode is mainly used when the statistical characteristics of the residual signal include a large number of high-frequency components, and thus that the coding efficiency gain is not expected from the transformation. Residual signals with such characteristics are often found in screen content.

In the discussion of the next-generation video coding standard (Versatile Video Coding (VVC)), several new coding tools have been introduced that enable better coding performance compared to the standard of High Efficiency Video Coding (HEVC). The Multiple Transform Selection (MTS) technique introduced in VVC relies on three trigonometric transforms including DCT-2, DST-7, and DCT-8, and the video encoding apparatus may select horizontal and vertical transforms that maximize the rate-distortion cost.

TABLE 1

| Transform Type | Basis function $T_i(j)$, i, j = 0, 1, ..., N−1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ |
|  | where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{4N+1}\right)$ |

For a block to which MTS is applied, one or more syntax elements may be signaled to indicate which transform kernels are used in a horizontal direction and a vertical direction.

As an example, three flags (MTS_CU_flag, MTS_Hor_flag, MTS_Ver_flag) may be used together with a predefined mapping table as shown in Table 2.

TABLE 2

| MTS_CU_flag | MTS_Hor_flag | MTS_Ver_flag | Intra/inter | |
|---|---|---|---|---|
| | | | Horizontal | Vertical |
| 0 | — | — | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

First, one flag (MTS_CU_flag) indicating whether DCT-2 is used in both the horizontal direction and the vertical direction may be signaled. When DCT-2 is not applied in both directions, one flag (MTS_Hor_flag) indicating which transform kernel between DST-7 and DCT-8 is to be applied in the horizontal direction may be signaled, and one flag (MTS_Ver_flag) indicating which transform kernel between DST-7 and DCT-8 is to be applied in the vertical direction may be signaled. DST-7 and DCT-8 may be used for block sizes of up to 32×32, and DCT-2 may be used for block sizes of up to 64×64. Accordingly, MTS_CU_flag may be signaled when the size (width and height) of the block is less than or equal to 32 and the block has at least one non-zero residual signal. When MTS_CU_flag is not present, MTS_CU_flag may be inferred to be 0.

Alternatively, a syntax element (tu_mts_idx) indicating an MTS kernel index may be used together with a predefined mapping table as shown in Table 3. tu_mts_idx indicates an MTS kernel index, and horizontal and vertical kernels are defined according to each index value. In Table 3, trTypeHor and trTypeVer indicate the types of kernels in the horizontal and vertical directions. The index value 0 represents DCT-2, the index value 1 represents DST-7, and the index value 2 represents DCT-8.

TABLE 3

| tu_mts_idx | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

In some cases, tu_mts_idx may be implicitly derived by the encoding apparatus or the decoding apparatus. For example, selection of a transform kernel may be performed based on information such as an intra-prediction mode, an inter-prediction mode, and a block size.

As discussed above, a transform block may be coded without a transform operation. This is indicated by a syntax element transform_skip_flag, which is signaled for a transform block having at least one non-zero coefficient. High-level control of the coding mode of the transform block is achieved by high-level syntax (HLS) elements transform_skip_enabled_flag and log 2_transform_skip_max_size_minus2 such as a sequential parameter set (SPS). When transform_skip_enabled_flag is 1, transform_skip_flag is coded for a transform block whose height and width are "1<<(log 2_transform_skip_max_size_minus2+2)" or less. If transform_skip_flag is 1, the associated transform block is coded in the transform skip mode. Otherwise, MTS-based transform may be applied to the associated transform block.

Table 4 shows part of the transform unit syntax specified in the draft VVC 5.

TABLE 4

```
if( tu_cbf_luma[ x0 ][ y0 ] && treeType != DUAL_TREE_CHROMA
    && ( tbWidth <= 32 ) && ( tbHeight <= 32 )
    && ( IntraSubPartitionsSplit[ x0 ][ y0 ] = = ISP_NO_SPLIT )
&& ( !cu_sbt_flag) ) {
    if( transform_skip_enabled_flag && tbWidth <= MaxTsSize && tbHeight
<= MaxTsSize)
        transform_skip_flag[ x0 ][ y0 ]                                    ae(v)
    if( (( CuPredMode[ x0 ][ y0 ] != MODE_INTRA &&
sps_explicit_mts_inter_enabled_flag)
        | | ( CuPredMode[ x0 ][ y0 ] = = MODE_INTRA &&
sps_explicit_mts_intra_enabled_flag))
        && ( !transform_skip_flag [ x0 ][ y0 ] ) )
        tu_mts_idx[ x0 ][ y0 ]                                             ae(v)
}
```

As described above, according to the previously discussed method, the video encoding/decoding apparatus may select one or two different transform kernels to be used for transforming the associated residual block of a transform block or may code the residual block without transforming the residual block. However, the method does not provide flexibility that allows the residual block to be partitioned into smaller blocks such that the transform skip is applied to some of the smaller blocks and a transform is applied to the rest of the smaller blocks. This constraint may limit coding efficiency for video data for which the transform skip may frequently be used, such as screen content.

1. Subblock-Based Transform Skip Mode for Transform Block

According to an aspect of the present disclosure, a modified transform technique is proposed in which a residual block of a transform block is partitioned into a plurality of subblocks, and whether to skip transform and apply MTS is determined on a subblock-by-subblock basis. According to the proposed technique, for a block to which transform skip is applied (i.e., a block for which transform_skip_flag=1), the transform mode and the transform skip mode may coexist at the subblock level. Diversity of transform modes in the residual block may improve encoding efficiency of screen content or content in which natural signals and screen content are mixed in a frame.

FIGS. 5A-5D show transform skip types applicable to a residual data block of a transform block to which transform skip is applied. The available transform skip types may include a non-split type in which transform skip is applied to all related residual values of the transform block (e.g., FIG. 5B), and one or more split types in which transform is skipped only for related residual values of a specific subblock in the transform block (e.g., FIGS. 5B to 5D). Among the transform skip types, a transform block to which a partition type (e.g., FIGS. 5B to 5D) is applied includes a specific subblock for which transform is skipped and one or more subblocks to which transform is applied.

Figure 5A:
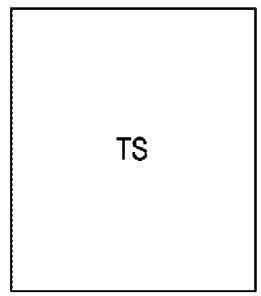
FIGS. 5A through 5D show transform skip types applicable to a residual data block of a transform block to which transform skip is applied.

First, in the non-split type illustrated in FIG. 5A, all residual signals in the transform block are coded in the transform skip mode. In the partition type illustrated in FIG. 5B, the transform block is partitioned into four subblocks, among which only residual signals related to the top left subblock are coded in the transform skip mode, and a transform is applied to each of the remaining subblocks. According to the partition type illustrated in FIG. 5C, the transform block is horizontally partitioned into two subblocks, such that the transform skip is applied only to the upper subblock, and a transform is applied to the lower subblock. According to the partition type illustrated in FIG. 5D, the transform block is vertically partitioned into two subblocks, such that the transform skip is applied only to the left subblock, and a transform is applied to the right subblock.

In order to signal a transform skip type selected from among various transform skip types as described above, the transform technique of the present disclosure introduces transform_skip_partition_flag or transform_skip_partition_idx as an additional syntax element signaled for a transform block having at least one non-zero coefficient. The proposed transform technique may give diversity of transform modes within a transform block and improve encoding efficiency by allowing the transform to be skipped or applied at the subblock level of the transform block.

First Embodiment: Introduction of Transform_Skip_Partition_Flag

In this embodiment, when transform skip is applied to a residual block related to the current block (that is, transform_skip_flag=1), a 1-bit flag (transform_skip_partition_flag) indicating the transform skip type applied to the residual block is additionally signaled.

A part of an exemplary transform unit syntax proposed based on the VVC 5 draft is provided below. In the syntax below, graying of elements is used to indicate potential changes in the syntax or provide understanding thereof.

TABLE 5

```
if(tu_cbf_luma[ x0 ][ y0 ] && treeType != DUAL_TREE_CHROMA
    && ( tbWidth <= 32 ) && ( tbHeight <= 32 )
    && (IntraSubPartitionsSplit[ x0 ][ y0 ] = = ISP_NO_SPLIT) && ( !cu_sbt_flag) ) {
  if( transform_skip_enabled_flag &&
      log2TbWidth <= MaxTsSize && log2TbHeight <= MaxTsSize )
    transform_skip_flag[ x0 ][ y0 ]
    if( transform_skip_flag[ x0 ][ y0 ] )
      transform_skip_split_flag[ x0 ][ y0 ]
  if( ( CuPredMode[ x0 ][ y0 ] == MODE_INTER && sps_mts_inter_enabled_flag ) | |
      ( CuPredMode[ x0 ][ y0 ] == MODE_INTRA && sps_mts_intra_enabled_flag ) &&
      ( tbWidth <= 32 ) && (tbHeight <= 32 ) && ( !transform_skip_flag[ x0 ][ y0 ]
| | !transform_skip_split_flag[ x0 ][ y0 ]) )
    tu_mts_idx[ x0 ][ y0 ]
}
```

First, when transform_skip_partition_flag is 0, the transform operation is not applied to any samples in a related residual block (see FIG. 5A). Therefore, when the width and height of the residual block are nTbW and nTbH, the range of x and y of the sample array to which the transform skip applies are given as x={0 . . . nTbW−1} and y={0 . . . nTbH−1}.

Figure 5B:
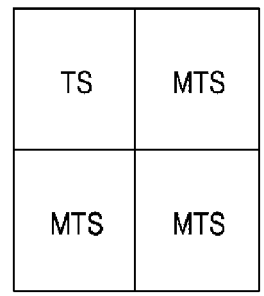
Figure 5C:
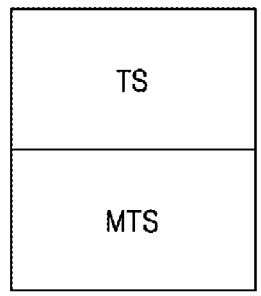
Figure 5D:
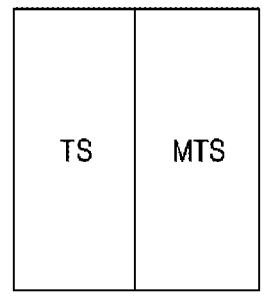

Next, when transform_skip_partition_flag is 1, one predetermined partition type among the partition types illustrated in FIGS. 5B to 5D may be used.

As an example, when transform_skip_partition_flag is 1, the video encoding apparatus/decoding apparatus horizontally divides the original transform block into halves and vertically divides the same into halves, and then applies the transform skip only to the top left block (see FIG. 5B). That is, the ranges of x and y of the sample array to which the transform skip is to be applied are set as x={0 . . . nTbW/2−1} and y={0 . . . nTbH/2−1}. For the remaining three blocks, tu_mts_idx, which is a MTS-related syntax element, is additionally parsed from the bitstream to determine whether MTS is to be applied. Here, a region to which MTS is applicable does not have a rectangular shape, and the transform operation is performed on each of the three rectangular blocks. That is, a one-dimensional transform kernel of size TbW/2 in the horizontal direction and a one-dimensional transform kernel of size TbH/2 in the vertical direction, indicated by tu_mts_idx, are applied to each of the rectangular blocks.

As another example, when transform_skip_partition_flag is 1, the video encoding apparatus/decoding apparatus horizontally divides the original transform block into halves and applies the transform skip only to the upper block (see FIG. 5C). That is, the ranges of x and y of the sample array to which the transform skip is to be applied are set as x={0 . . . nTbW−1} and y={0 . . . nTbH/2−1}. For the lower block, tu_mts_idx, which is a MTS-related syntax element, is additionally parsed from the bitstream to determine whether MTS is to be applied.

As still another example, when transform_skip_partition_flag is 1, the video encoding apparatus/decoding apparatus vertically divides the original transform block into halves, and applies the transform skip only to the left block (see FIG. 5D). That is, the ranges of x and y of the sample array to which the transform skip is to be applied are set as x={0 . . . nTbW/2−1} and y={0 . . . nTbH−1}. For the right block, tu_mts_idx, which is a MTS-related syntax element, is additionally parsed from the bitstream to determine whether MTS is to be applied.

Second Embodiment: Introduction of Transform_Skip_Partition_Idx

In this embodiment, when transform skip is applied to a residual block associated with the current block (i.e., transform_skip_flag=1), a syntax element (transform_skip_partition_idx) indicating the transform skip type applied to the residual block is additionally signaled.

A part of an exemplary transform unit syntax proposed based on the VVC 5 draft is provided below.

TABLE 6

```
if(tu_cbf_luma[ x0 ][ y0 ] && treeType != DUAL_TREE_CHROMA
    && ( tbWidth <= 32 ) && ( tbHeight <= 32 )
    && (IntraSubPartitionsSplit[ x0 ][ y0 ] = = ISP_NO_SPLIT) && ( !cu_sbt_flag) ) {
  if( transform_skip_enabled_flag &&
      log2TbWidth <= MaxTsSize && log2TbHeight <= MaxTsSize )
    transform_skip_flag[ x0 ][ y0 ]
    if( transform_skip_flag[ x0 ][ y0 ] )
      transform_skip_split_flag_idx[ x0 ][ y0 ]
    if( ( CuPredMode[ x0 ][ y0 ] = = MODE_INTER && sps_mts_inter_enabled_flag ) | |
      ( CuPredMode[ x0 ][ y0 ] = = MODE_INTRA && sps_mts_intra_enabled_flag ) &&
      ( tbWidth <= 32 ) && (tbHeight <= 32 ) && ( !transform_skip_flag[ x0 ][ y0 ]
| | !transform_skip_split_flag_idx[ x0 ][ y0 ] > 0 ) )
tu_mts_idx[ x0 ][ y0 ]
    }
```

As an example, the syntax element transform_skip_partition_idx may have three values: 0, 1, and 2.

First, when transform_skip_partition_idx is 0, the transform operation is not applied to any samples in a MTS-related transform block (see FIG. 5A). Therefore, the range of x and y of the sample array to which the transform skip applies are given as x={0 . . . nTbW−1} and y={0 . . . nTbH−1}.

Next, when transform skip_partition_idx is 1, the encoding apparatus/decoding apparatus horizontally divides the original transform block into halves, and applies the transform skip to only the upper block (see FIG. 5C). That is, the ranges of x and y of the sample array to which the transform skip is to be applied are set as x={0 . . . nTbW−1}, y={0 . . . nTbH/2−1}. For the lower block, tu_mts_idx, which is a MTS-related syntax element, is additionally parsed from the bitstream to determine whether MTS is to be applied.

Finally, when transform_skippartition_idx is 2, the encoding apparatus/decoding apparatus vertically divides the original transform block into halves, and applies the transform skip only to the left block (see FIG. 5D). That is, the ranges of x and y of the sample array to which the transform skip is to be applied are set as x={0 . . . nTbW/2−1}, y={0 . . . nTbH−1}. For the right block, tu_mts_idx, which is a MTS-related syntax element, is additionally parsed from the bitstream to determine whether MTS is to be applied.

When transform_skippartition_idx is 1 and 2, the process may be reversed. Also, the left block/upper block to which the transform skip is applied may be replaced with the right block/lower block. In addition, the top left block to which the transform skip is applied may be replaced with the bottom left, top right, or bottom right block.

If transform_skip_partition_idx can have four values of {0, 1, 2, 3}, processing of a transform block such as the partition type illustrated in FIG. 5B may be additionally considered. For example, when transform_skip_partition_idx is 3, the encoding apparatus/decoding apparatus horizontally divides the original transform block into halves and vertically divides the same into halves, and then applies the transform skip only to the top left block. For the remaining three blocks, tu_mts_idx, which is a MTS-related syntax element, may be additionally parsed from the bitstream to determine whether MTS is to be applied.

Furthermore, if transform_skip_Partition_idx can have more values, more various partition types (e.g., horizontal or vertical partitioning into halves is performed more than once) may be available, and thus the transform skip may be applied to smaller blocks.

2. Transform Skip Mode in ISP Coding

Intra sub-partition (ISP) is a coding tool to divide a CU into two or four subblocks of the same size in the vertical or horizontal direction according to the size thereof and perform prediction on each of the subblocks in the same intra prediction mode. The reconstructed sample values (or predicted sample values) of each subblock are available for prediction of the next subblock, which is iteratively processed for each subblock.

For example, when a current block CU to which ISP is applied is divided into 4 parallel subblocks, a first subblock may be predicted from neighbor samples of the current block CU, and a second subblock may be predicted from neighbor pixels including the samples of the first subblock. A third subblock may be predicted from neighbor samples including the samples of the second subblock, and a fourth subblock may be predicted from neighbor samples including the samples of the third subblock. In this way, samples in the current block CU may be used to predict other samples of the current block CU, rather than predicting all pixels of the current block CU from the samples of previously coded or decoded neighbor blocks of the current block CU.

One advantage of the ISP is that reconstructed neighbor samples tend to be much closer to the predicted sample than in the scenario of typical intra-prediction. Since the reconstructed neighbor samples from which the current sample is predicted are positioned closer to the current sample, the accuracy of prediction of the current sample may be improved.

Figure 6A:
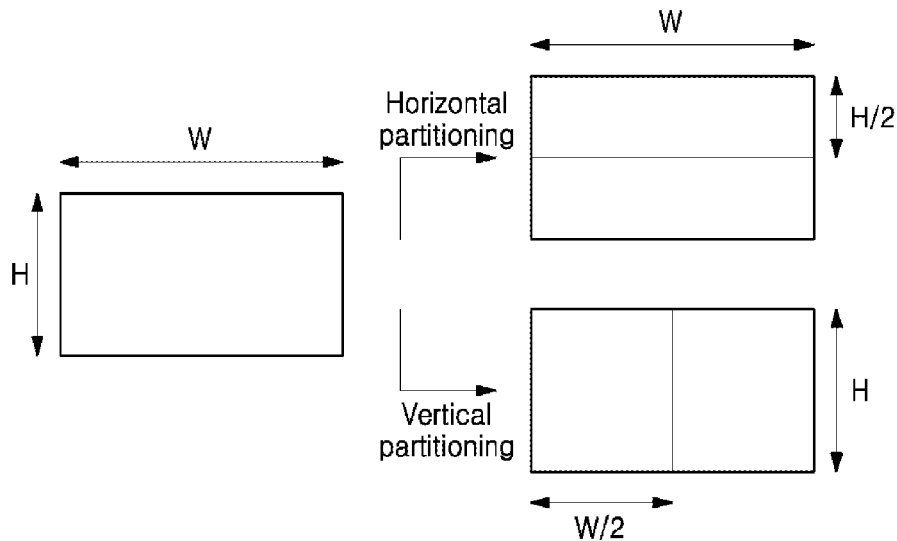
FIGS. 6A and 6B exemplarily shows types of a plurality of subblocks into which a current block subjected to intra-prediction coding may be partitioned according to an embodiment of the present disclosure.
Figure 6B:
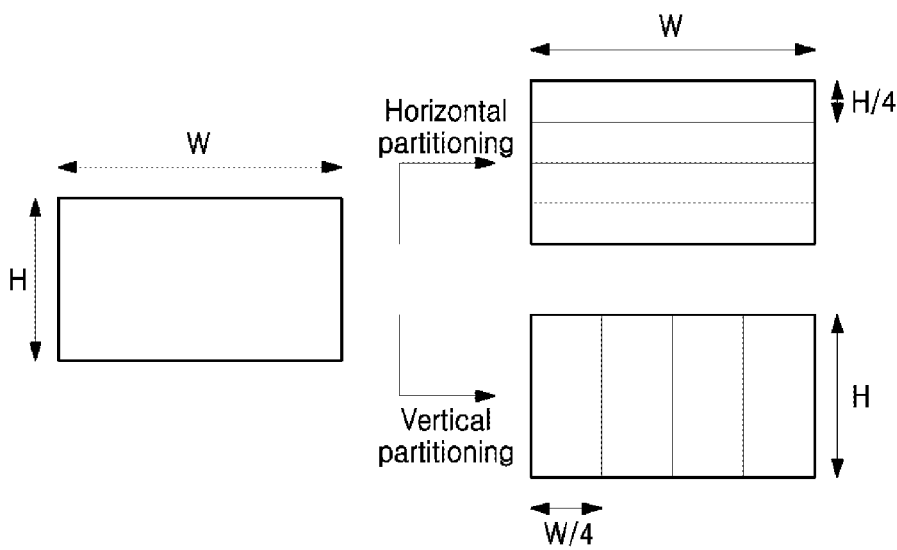

FIGS. 6A and 6B are diagrams illustrating possible types of partitioning of a current block coded in the ISP mode into a plurality of subblocks according to an embodiment of the present disclosure. The minimum block size to which the ISP is applicable may be 4×8 or 8×4. Also, a constraint may be added that all subblocks have a minimum of 16 samples. As shown in Table 7, when a block has a size of 4×8 or 8×4, it may be divided into two parts. When the block has a larger size, it may be divided into 4 or 8 parts.

TABLE 7

| Size of current block | Number of subblocks |
| --- | --- |
| 4 × 4 | Not divided |
| 4 × 4 and 8 × 4 | 2 |
| others | 4 |

The video encoding apparatus may signal a partition flag (e.g., intra_subpartitions_mode_flag) indicating that the current block has been encoded in the ISP coding mode (that is, the current block has been divided into a plurality of subblocks, and the subblocks have been sequentially intra-predicted). The partition flag may be also inferred by the video decoding apparatus without explicit signaling (that is, without decoding from the bitstream), depending on the width and height of the current block, the area of the current block, the minimum transform size and/or the maximum transform size allowed for transforming transform coefficients. As an example, when the width and height of the current block are less than the minimum transform size, the partition flag may be set to a first value indicating that the current block is not partitioned, without being decoded from the bitstream. As another example, when the width and height of the current block are greater than the maximum transform size, the partition flag may have a second value without being decoded from the bitstream, that is, it may be inferred that the current block is divided into a plurality of subblocks and each of the subblocks is intra-predicted.

When the ISP is applied to the current block, information about the direction of subblock partitioning may be provided in various ways. For example, a partitioning direction flag (e.g., intra_subpartitions_split_flag) indicating whether subblock partitioning is performed in a horizontal direction or a vertical direction may be signaled. In some cases, when the width of the current block, cbWidth, is greater than the maximum transform size, the direction of subblock partitioning may be inferred to be the vertical direction. When the height of the current block, cbHeight, is greater than the maximum transform size, the subblock partitioning may be inferred to be the horizontal direction.

When ISP is applied to the current block, the video decoding apparatus reconstructs the current block by sequentially reconstructing a plurality of subblocks using the intra prediction mode determined for the current block. For example, the video decoding apparatus may generate an intra-predicted subblock by predicting a target subblock to be reconstructed from among the plurality of subblocks based on previously reconstructed pixels around the subblock. The video decoding apparatus may reconstruct transform coefficients by decoding transform coefficient information corresponding to the subblock from a bitstream, and inversely quantize and inversely transform the transform coefficients using the same transform size as the subblock to be reconstructed, thereby generating a residual subblock having residual signals. The video decoding apparatus may reconstruct the subblock using the intra-predicted subblock and the residual subblock. In particular, pixels in the reconstructed subblock may be used to intra-predict the next subblock in the current block. By this process, processing is sequentially performed from the subblock including the top-left sample of the current block in the downward direction in the case of horizontal partitioning and in the rightward direction in the case of vertical partitioning.

When ISP is applied to the current block, signaling of the MTS-related syntax element(s) of Table 1 or Table 3 above for signaling which transform kernels are used in the horizontal and vertical directions of each subblock may be skipped, and the transform kernels may be selected based on the intra-prediction mode of the current block and the sizes of subblocks, and thus may be implicitly derived by the video decoding apparatus. Specifically, for a subblock having a size of w×h, horizontal transform (t_H) and vertical transform (t_V) may be selected as follows:

When w=1 or h=1, horizontal or vertical transform is not applied;

If w=2 or w >32, then t_H=DCT-II:

If h=2 or h >32, then t_V=DCT-II;

Otherwise, the transform is selected as shown in Table 8.

TABLE 8

| Intra mode | $t_H$ | $t_V$ |
|---|---|---|
| Planar<br>Ang. 31, 32, 34, 36, 37 | DST-VII | DST-VII |
| DC<br>Ang. 33, 35 | DCT-II | DCT-II |
| Ang. 2, 4, 6 . . . 28, 30<br>Ang. 39, 41, 43 . . . 63, 65 | DST-VII | DCT-II |
| Ang. 3, 5, 7 . . . 27, 29<br>Ang. 38, 40, 42 . . . 64, 66 | DCT-II | DST-VII |

According to another aspect of the present disclosure, a modified transform scheme is proposed in which whether to skip transform is determined on a subblock-by-subblock basis when ISP is applied to a current block to be intra prediction coded. The proposed transform technique signals transform_skip_flag as a syntax element indicating whether to apply transform skip to each subblock having at least one non-zero coefficient. In this case, transform skip flag, which would be signaled at the coding unit (CU) level corresponding to the current block may be omitted.

A part of an exemplary transform unit syntax proposed based on the VVC 5 draft is provided below.

TABLE 9

| transform_unit( x0, y0, tbWidth, tbHeight, treeType, subTuIndex ) { | Descriptor |
|---|---|
| ... 생략 ... | |
|   if( tu_cbf_luma[ x0 ][ y0 ] && treeType != DUAL TREE CHROMA<br>    && ( tbWidth <= 32 ) && ( tbHeight <= 32 )<br>    && ( IntraSubPartitionsSplit[ x0 ][ y0 ] = = ISP_NO_SPLIT ) && ( !cu_sbt_flag ) ) { | |
|     if( transform_skip_enabled_flag && tbWidth <= MaxTsSize && tbHeight <=<br>MaxTsSize | |
|       transform_skip_flag[ x0 ][ y0 ] | ae(v) |
|       if( (( CuPredMode[ x0 ][ y0 ] != MODE_INTRA && sps_explicit_mts_inter_enabled_flag )<br>        | | ( CuPredMode[ x0 ][ y0 ] = = MODE_INTRA && sps_explicit_mts_intra_enabled_flag ))<br>      && ( !transform_skip_flag[ x0 ][ y0 ] ) ) | |
|         tu_mts_idx[ x0 ][ y0 ] | ae(v) |
|   } | |
|   if( tu_cbf luma[ x0 ][ y0 ] && treeType != DUAL_TREE_CHROMA<br>    && ( tbWidth <= 32 ) && ( tbHeight <= 32)<br>    && ( IntraSubPartitionsSplit[ x0 ][ y0 ] != ISP_NO_SPLIT && ( !cu_sbt_flag )<br>    && transform skip_enabled_flag && transform_skip_enabled_in_ISP_flag<br>    && tbWidth <= MaxTsSize && tbHeight <= MaxTsSize) { | |
|     transform_skip_flag[ x0 ][ y0 ] | ae(v) |
| if( tu_cbf_luma[ x0 ][ y0 ] )<br>  residual_coding( x0, y0, Log2( tbWidth ), Log2( tbHeight ), 0 ) | |

TABLE 9-continued

| transform_unit( x0, y0, tbWidth, tbHeight, treeType, subTuIndex ) { | Descriptor |
|---|---|
|   if( tu_cbf_ch[ x0 ][ y0 ] )<br>    residual_coding( xC, yC, Log2( wC ), Log2( hC ), 1 )<br>  if( tu_cbf_cr[ x0 ][ y0 ] )<br>    residual_coding( xC, yC, Log2( wC ), Log2( hC ), 2 )<br>} | |

In some cases, whether to allow application of transform skip to subblocks of the block to which the ISP is applied may be signaled through a higher-level syntax element. For example, for higher-level control of the transform skip mode, transform_skip_enabled_in_ISPflag as well as transform_skipe_enabled_flag and log 2_transform_skip_max_size_minus2 may be signaled in the sequential parameter set (SPS).

form_skip_flag is 1, the associated transform block is coded in the transform skip mode. Otherwise, the transform is applied to the associated transform block.

According to the adoption of QTBTTT partitioning, the shape of the current block may be a square or a rectangle. According to an aspect of the present disclosure, in order to efficiently apply the transform skip mode to a rectangular block, a disabling condition for the transform skip mode

TABLE 10

| transform_unit( x0, y0, tbWidth, tbHeight, treeType, subTuIndex ) { | Descriptor |
|---|---|
| ...설명... <br>  if( tu_cbf_luma[ x0 ][ y0 ] && treeType != DUAL TREE CHROMA<br>    && ( tbWidth <= 32 ) && ( tbHeight <= 32 )<br>    && ( IntraSubPartitionsSplit[ x0 ][ y0 ] = = ISP_NO_SPLIT ) && ( !cu_sbt_flag ) ) {<br>  if( transform_skip_enabled_flag && tbWidth <= MaxTsSize && tbHeight <=<br>MaxTsSize<br>    transform_skip_flag[ x0 ][ y0 ]<br>    if( (( CuPredMode[ x0 ][ y0 ] != MODE_INTRA && sps_explicit_mts_inter_enabled_flag )<br>      | | ( CuPredMode[ x0 ][ y0 ] = = MODE_INTRA && sps_explicit_mts_intra_enabled_flag ))<br>      && ( !transform_skip_flag[ x0 ][ y0 ] ) )<br>      tu_mts_idx[ x0 ][ y0 ]<br>  }<br>  if( tu_cbf luma[ x0 ][ y0 ] && treeType != DUAL_TREE_CHROMA<br>    && ( tbWidth <= 32 ) && ( tbHeight <= 32 )<br>    && ( IntraSubPartitionsSplit[ x0 ][ y0 ] != ISP_NO_SPLIT && ( !cu_sbt_flag )<br>    && transform skip_enabled_flag && tbWidth <= MaxTsSize && tbHeight <=<br>MaxTsSize) {<br>    transform_skip_flag[ x0 ][ y0 ]<br>  if( tu_cbf_luma[ x0 ][ y0 ] )<br>    residual_coding( x0, y0, Log2( tbWidth ), Log2( tbHeight ), 0 )<br>  if( tu_cbf_ch[ x0 ][ y0 ] )<br>    residual_coding( xC, yC, Log2( wC ), Log2( hC ), 1 )<br>  if( tu_cbf_cr[ x0 ][ y0 ] )<br>    residual_coding( xC, yC, Log2( wC ), Log2( hC ), 2 )<br>} | <br><br><br><br><br><br>ae(v)<br><br><br><br>ae(v)<br><br><br><br><br><br><br>ae(v) |

As shown in Table 10, when transform_skip_enabled_flag is 1 and transform_skip_enabled_in_ISP_flag is 1, transform_skip_flag may be coded for a subblock whose width and height are less than or equal to "MaxTsSize=1<<(log 2_transform_skip_max_size_minus2+2)". If transform_skip_flag signaled for the subblock is 1, the associated subblock is coded in the transform skip mode. Otherwise, MTS transform may be applied to the associated subblock.

3. Modification of the Disable Condition for the Transform Skip Mode

As discussed above, typically, the maximum size of a block to which the transform skip mode is applicable is controlled by the syntax element log 2_transform_skip_max_size_minus2 in the sequential parameter set (SPS). The maximum size (MaxTsSize) of a block to which the transform skip mode is applicable is determined as follows.

MaxTsSize=1<<(log 2_transform_skip_max_size_minus2+2)

When transform_skip_enabled_flag is 1, transform_skip_flag is coded for a transform block whose height and width are less than or equal to "MaxTsSize". If transmay be differently controlled for the width and height of the block. That is, the maximum width (MaxTsSizeX) and the maximum height (MaxTsSizeY) of a block to which the transform skip mode is applicable may be controlled differently.

In some embodiments, such control may be achieved by introducing the syntax elements log 2_transform_skip_max_size_X_minus2 and log 2_transform_skip_max_size_Y_minus2, which are signaled in the SPS.

MaxTsSizeX=1<<(log 2_transform_skip_max_size_X_minus2+2)

MaxTsSizeY=1<<(log 2_transform_skip_max_size_Y_minus2+2)

In some other embodiments, the syntax element log 2_transform_skip_max_size_minus2 may be explicitly signaled in the SPS, but MaxTsSizeX and MaxTsSizeY may be derived from MaxTsSize according to the ratio of the width (CbWidth) to the height (CbHeight) of the block. Specifically, the following method may be used.

(a) Derive the scale factor S as follows:
S=max (CbWidth, CbHeight)/min (CbWidth, CbHeight).
(b) For the direction of the greater one between CbWidth and CbHeight, applying MaxTsSize to determine whether the transform skip mode is used.
(c) For the direction of the smaller one between CbWidth and CbHeight, applying (MaxTsSize/S) to determine whether the transform skip mode is used.

4. Controlling the Transform Skip Mode of Luma Block and Chroma Block

According to another aspect of the present disclosure, the maximum size of a block to which the transform skip mode is applicable may be controlled differently for a luma block and a chroma block.

In one example, such control may be achieved by introducing the syntax elements log 2_transform_skip_max_size_minus2 and log 2_transform_skip_max_size_C_minus2, which are signaled in the SPS. In this case, the maximum size (MaxTsSize) of the luma block to which the transform skip mode is applicable and the maximum size (MaxTsSizeC) of the chroma block to which the transform skip mode is applicable are respectively determined as follows:

MaxTsSize=1<<(log 2transform_skip_max_size_minus2+2);

MaxTsSizeC=1<<(log 2 transform_skip_max_size_C_minus2+2).

In another example, the maximum size (MaxTsSizeC) of the chroma block to which the transform skip mode is applicable may be derived from the maximum size (MaxTsSize) of the luma block to which the transform skip mode is applicable, depending on a syntax element chroma_format_idc (cIdx) indicating the sampling format of a video signaled at the SPS level. As a specific example, referring to Table 11, when cIdx=0, MaxTsSizeC is set equal to 0. When cIdx=1, MaxTsSizeC is set equal to (MaxTsSize>>1). When cIdx=2, MaxTsSizeC is set equal to (MaxTsSize >>1) for the width of the block and MaxTsSizeC is set equal to MaxTsSize for the height of the block. When cIdx=3, MaxTsSizeC is set equal to MaxTsSize.

TABLE 11

| chroma_format_idc | Chroma format | SubWidthC | SubHeightC | MaxTsSizeC |
|---|---|---|---|---|
| 0 | Monochrome | 1 | 1 | — |
| 1 | 4:2:0 | 2 | 2 | MaxTsSize/2 |
| 2 | 4:2:2 | 2 | 1 | MaxTsSize/2너비 MaxTsSize 높이 |
| 3 | 4:4:4 | I | 1 | MaxTsSize |

In another example, whether the chroma block of the current block satisfies the constraint on "the maximum size of a block to which the transform skip mode is applicable" may be determined based on SubWidthC and SubHeightC, which are variables determined from chroma_format_idc. For example, when the width (cbWidth) and height (cbHeight) of the chroma block of the current block satisfy Equation 1 (or Equation 2) below, applying the transform skip mode to the chroma block of the current block may be allowed.

cbWidth/SubWidthC<=MaxTsSize, and cbHeight/SubHeightC<MaxTsSize.   [Equation 1]

Here, MaxTsSize may be specified by log 2_transform_skip_max_size_minus2, which is signaled in the SPS.

cbWidth/SubWidthC<=MaxTsSizeX, and cbHeight/SubHeightC<=MaxTsSizeY.   [Equation 2]

Here, MaxTsSizeX and MaxTsSizeY may be specified by log 2_transform_skip_max_size_X_minus2 and log 2_transform_skip_max_size_Y_minus2, which are signaled in the SPS.

Figure 7:
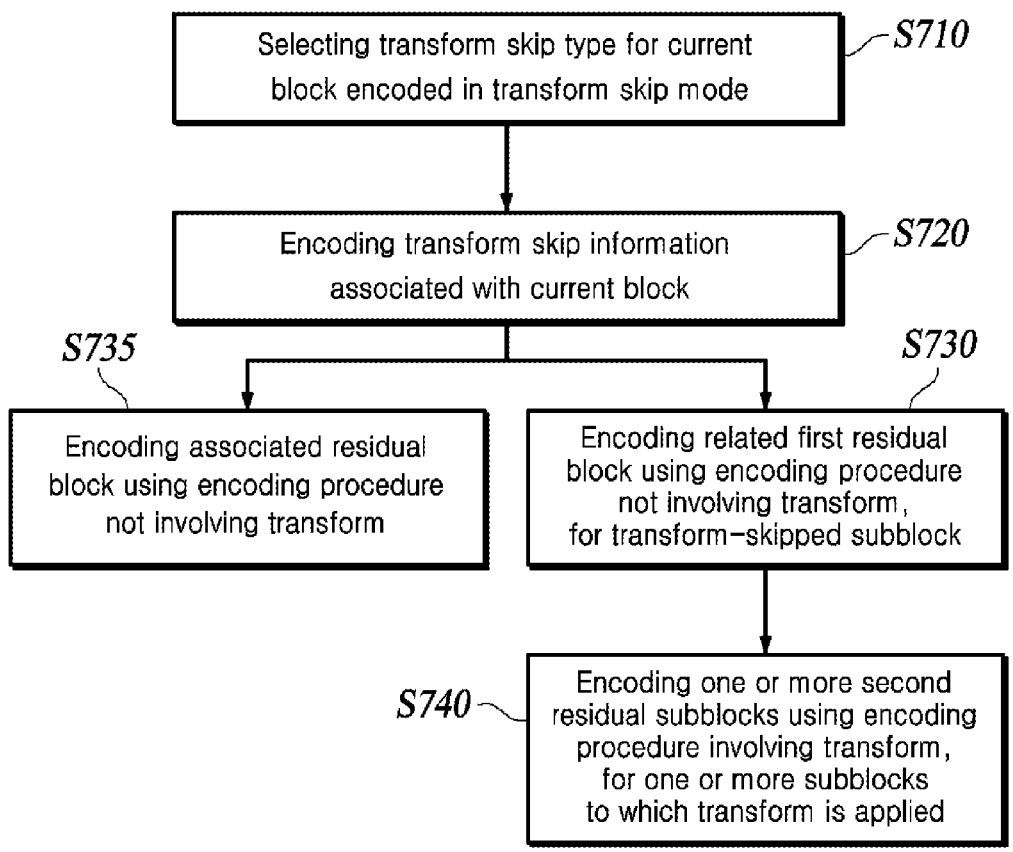
FIG. 7 is a flowchart illustrating a method for encoding video data by a video encoding apparatus according to an embodiment of the present disclosure.

FIG. 7 is a flowchart illustrating a method for encoding video data by a video encoding apparatus according to an embodiment of the present disclosure.

The video encoding apparatus may determine a scenario that provides a desirable rate-distortion cost by testing multiple different coding scenarios. As part of testing the various coding scenarios, the video encoding apparatus may determine whether to encode a transform block in the transform mode or the transform skip mode based on, for example, coding efficiency for the transform block. In performing the encoding in the transform skip mode, the video encoding apparatus may select a transform skip type suitable for the current transform block from among the transform skip types illustrated in FIG. 5 (S710). For example, when applying a transform such as discrete cosine transform (DCT) does not provide any gain in coding efficiency, the transform may be skipped for the current transform block. The video encoding apparatus may perform such determination based on the characteristics of the transform block as well as constraints and other control information provided in higher-level syntax elements, which will be described later. That is, the determination may be limited by higher-level syntax elements transform_skip_enabled_flag and log 2_transform_skip_max_size_minus2 such as the SPS.

For example, when transform_skip_enabled_flag is 1, transform_skip_flag is coded for a transform block whose height and width are "1<<(log 2_transform_skip_max_size_minus2+2)" or less. If transform_skip_flag is 1, the related transform block is coded in the transform skip mode. Otherwise, the transform is applied to the related transform block. In some cases, in addition to log 2_transform_skip_max_size_minus2, log 2_transform_skip_max_size_C_minus2, which specifies the maximum size of a chroma block to which the transform skip mode is applicable, may be used as an additional higher-level syntax element a.

The video encoding apparatus encodes transform skip information related to the current block (S720). Specifically, the video encoding apparatus encodes a first syntax element (e.g., transform_skip_flag) indicating whether a transform skip mode is selected for encoding of the current block. When the first syntax element indicates that the transform skip mode is selected for encoding of the current block, the video encoding apparatus further decodes a second syntax element (e.g., transform_skip_split_flag or transform_skip_split_idx) indicating the transform skip type selected for the current block. The available transform skip types include a non-split type in which all relevant residual values of the current block are transformed (e.g., FIG. 5A) and one or more split types in which transform is skipped only for related residual values of a specific subblock in the current block (e.g., FIGS. 5B to 5D). The current block to which any one of the split types is applied includes a specific subblock for which transform is skipped and one or more subblocks to which transform is applied.

When the transform skip type selected for the current block is the split type (namely, when the current block includes a subblock for which transform is skipped and one or more subblocks to which transform is applied), the video encoding apparatus encodes a related first residual subblock using an encoding procedure not involving transform for the subblock for which transform is skipped (S730), and encodes one or more related second subblocks using an encoding procedure involving transform for the one or more subblocks to which the transform is applied (S740). For example, the video encoding apparatus quantizes the first residual subblocks related to the subblock for which transform is skipped, without transform, and entropy-codes the quantized residual signals. Also, the video encoding apparatus selects transform kernels to be applied to the second sub-residual block in the horizontal direction and the vertical direction based on the intra-prediction mode, the inter-prediction mode, the size of the block, etc., and applies transform to the selected second residual subblock using the selected transform kernels. The video encoding apparatus may encode index information (e.g., tu_mts_idx) indicating the selected transform kernels.

When the transform skip type selected for the current block is a non-split type (that is, the transform-skipped current block does not include one or more subblocks to which transform is applied), the video encoding apparatus encodes a related residual block using the encoding procedure not involving transform (S735). That is, the residual signals related to the current block are quantized without transform, and the quantized residual signals are entropy-encoded.

Figure 8:
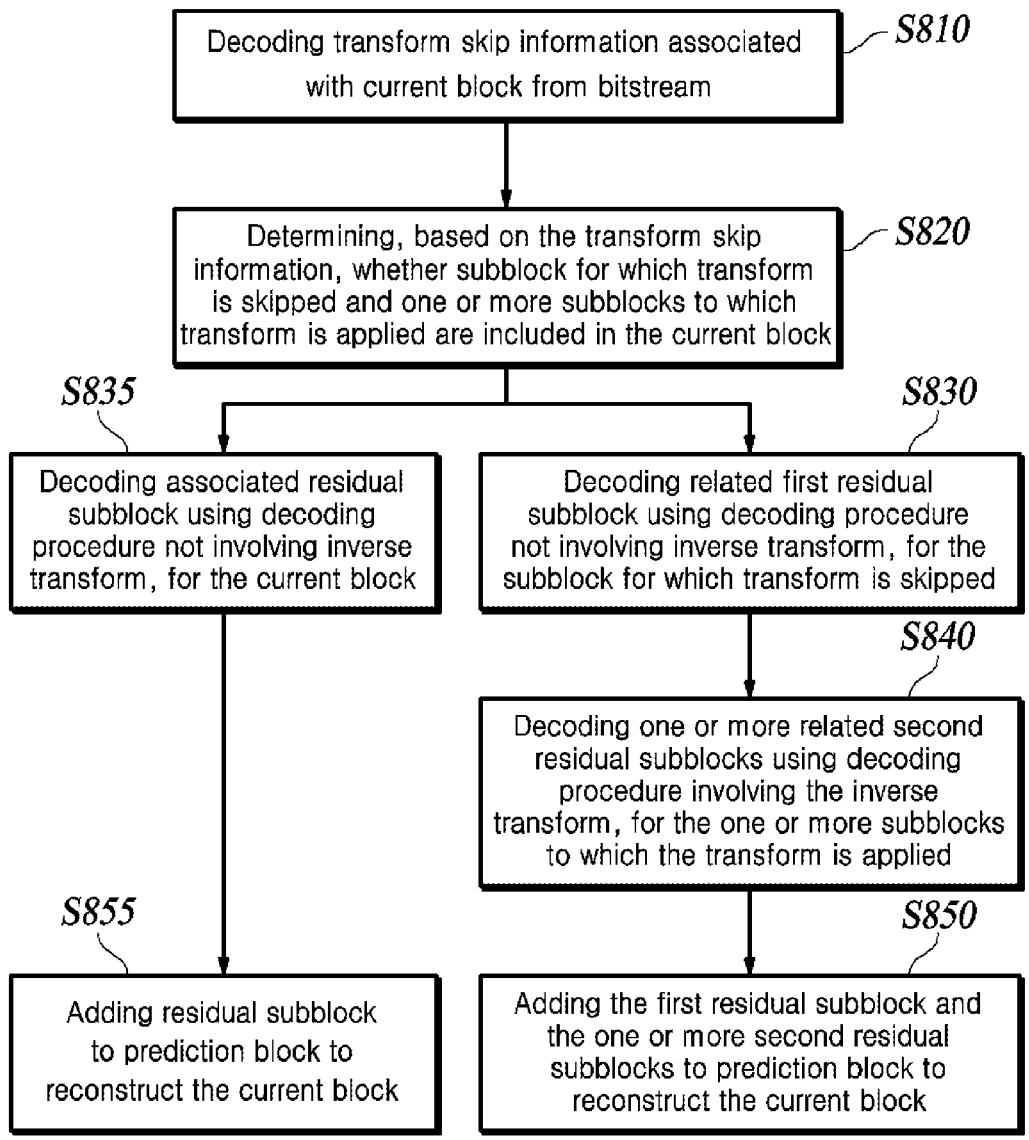
FIG. 8 is a flowchart illustrating a method for decoding video data by a video decoding apparatus according to an embodiment of the present disclosure.

FIG. 8 is a flowchart illustrating a method for decoding video data by a video decoding apparatus according to an embodiment of the present disclosure.

The video decoding apparatus decodes transform skip information related to the current block from the bitstream (S810). Specifically, the video decoding apparatus decodes a first syntax element (e.g., transform_skip_flag) indicating whether the transform skip mode is used for encoding of the current block. When the first syntax element indicates that the transform skip mode is used for encoding of the current block, the video decoding apparatus further decodes a second syntax element indicating the transform skip type selected for the current block. The available transform skip types include a non-split type in which all relevant residual values of the current block are transformed (e.g., FIG. 5A) and one or more split types in which transform is skipped only for related residual values of a specific subblock in the current block (e.g., FIGS. 5B to 5D).

As described above, higher-level control of the transform mode of blocks may be controlled by syntax elements in the SPS. Therefore, before decoding the first syntax element, the video decoding apparatus may determine the maximum size of the block to which the transform skip mode is applicable based on one or more high-level syntax elements (e.g., log 2_transform_skip_max_size_minus2) related to the current block. Here, the maximum size information may specify the maximum width and maximum height of the block to which the transform skip mode is applicable. When the current block is a block of a chroma component, the video decoding apparatus may determine the maximum size of a luma block to which the transform skip mode is applicable from the one or more high-level syntax elements, and derive the maximum size of the chroma block to which the transform skip mode is applicable from the maximum size information about the luma block, based on the chroma sampling format of the video data. Alternatively, the video decoding apparatus may determine the maximum size of the chroma block to which the transform skip mode is applicable directly from the one or more high-level syntax elements (e.g., log 2_transform_skip_max_size_C_minus2). The video decoding apparatus may determine whether the transform skip mode is applicable to the current block based on the maximum size information and the width and height of the current block. When it is determined that the transform skip mode is applicable to the current block, the video decoding apparatus may decode the first syntax element (e.g., transform_skip_flag).

The video decoding apparatus determines, based on the decoded transform skip information, whether a subblock to which transform is skipped and one or more subblocks to which transform is applied are included in the current block (S820).

When it is determined that the current block includes a subblock to which transform is skipped and one or more subblocks to which transform is applied, the video decoding apparatus decodes a related first residual subblock using a decoding procedure without inverse transform for the subblock for which the transform is skipped (S830), and decodes one or more related second residual subblocks using a decoding procedure including an inverse transform for one or more subblocks to which the transform is applied (S840). The video decoding apparatus adds the first residual subblock and the one or more second residual subblocks to the prediction block to reconstruct the current block (S850).

Here, the decoding of the one or more second residual subblocks may further include the following operations. The video decoding apparatus decodes, from a bitstream, index information (e.g., tu_mts_idx) indicating transform kernels applied in horizontal and vertical directions for the one or more subblocks to which transform is applied. The video decoding apparatus performs inverse transform on the one or more subblocks to which the transform is applied, using the transform kernels indicated by the index information.

When it is determined that the one or more subblocks to which the transform is applied are not included in the current block for which the transform is skipped, the video decoding apparatus decodes a related residual block using a decoding procedure without inverse transform for the current block (S835). That is, the residual block is reconstructed by entropy-decoding the residual signals related to the current block from the bitstream and performing inverse quantization on the decoded residual signals. The video decoding apparatus adds the residual block to the prediction block to reconstruct the current block (S855).

According to the techniques, methods, and apparatuses of the present disclosure described above, by providing flexibility in the application range of the transform skip mode compared to the conventional transform/transform skip mode, compression efficiency may be improved in encoding video data for which the transform skip may be frequently used. In particular, high compression performance may be provided for screen content or content in which natural signals and screen content are mixed in a frame. Therefore, the techniques, methods, and apparatuses may be useful in various content services such as game broadcasting, 360-degree video streaming, and online lectures.

It should be understood that the exemplary embodiments in the above description may be implemented in many different ways. The functions described in one or more examples may be implemented in hardware, software, firmware, or any combination thereof. It should be understood that the functional components described herein have been labeled " . . . unit" to particularly emphasize their independence in implementation.

Various functions or methods described in the present disclosure may be implemented as instructions stored in a non-transitory recording medium that is readable and executable by one or more processors. The instructions may be executed by one or more processors applied to one or more digital signal processors (DSPs), general purpose microprocessors, application specific integrated circuits (ASICs), field programmable logic arrays (FPGAs), or other equivalent integrated circuits or discrete logic circuits. The non-transitory recording medium includes, for example, all kinds of recording devices in which data is stored in a form readable by a computer system. For example, the non-transitory recording medium includes a storage medium such as an erasable programmable read only memory (EPROM), a flash drive, an optical drive, a magnetic hard drive, and a solid state drive (SSD).

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of decoding video data, comprising:
   determining, from one or more high-level syntax elements, maximum size information about a block to which a transform skip mode is applicable;
   decoding transform skip information associated with a current block from a bitstream based on the maximum size information;
   determining, based on the transform skip information, that a subblock for which transform is skipped and one or more subblocks to which transform is applied are included in the current block;
   in response to determining that the subblock for which the transform is skipped and the one or more subblocks to which the transform is applied are included in the current block, decoding a first residual subblock using a decoding procedure not involving inverse transform for the subblock for which the transform is skipped, and decoding one or more second residual subblocks using a decoding procedure involving the inverse transform for the one or more subblocks to which the transform is applied; and
   adding the first residual subblock and the one or more second residual subblocks to a prediction block to reconstruct the current block,
   wherein, when the current block is a chroma block, the decoding of the transform skip information comprises:
   deriving, from the maximum size information, a maximum size about a chroma block to which the transform skip mode is applicable based on a chroma sampling format of the video data; and
   decoding the transform skip information for the current block based on comparing the derived maximum size with a width and a height of the current block.

2. The method of claim 1, further comprising:
   in response to determining that the current block does not include the one or more subblocks to which the transform is applied, decoding an associated residual block using the decoding procedure not involving the inverse transform for the current block; and
   adding the associated residual block to the prediction block to reconstruct the current block.

3. The method of claim 1, wherein the decoding of the one or more second residual subblocks comprises:
   decoding, from the bitstream, an index indicating transform kernels applied in horizontal and vertical directions for each of the one or more subblocks to which the transform is applied; and
   performing the inverse transform on each of the one or more subblocks to which the transform is applied, using the transform kernels indicated by the index.

4. The method of claim 1, wherein the decoding of the transform skip information comprises:
   decoding a first syntax element indicating whether the transform skip mode is used for encoding of the current block; and
   in response to the first syntax element indicating that the transform skip mode is used for encoding of the current block, decoding a second syntax element indicating a transform skip type selected for the current block.

5. The method of claim 4, wherein the transform skip type includes a non-split type in which transform is skipped for all residual values of the current block and at least one split type in which transform is skipped for only residual values of a specific subblock in the current block.

6. The method of claim 1, wherein the maximum size information includes a maximum width and a maximum height of the block allowing application of the transform skip mode.

7. An apparatus for encoding video data, the apparatus comprising at least one processor configured to:
   encode, into a sequence parameter set (SPS) of a bitstream, one or more high-level syntax elements for indicating maximum size information about a block to which a transform skip mode is applicable;
   encode transform skip information associated with a current block based on the maximum size information;
   when it is indicated by the transform skip information that at least one subblock for which transform is skipped and at least one subblock to which transform is applied are included in the current block, encode a first residual subblock for the subblock for which the transform is skipped using an encoding procedure not involving transform for the first residual subblock, and encode a second residual subblock for the subblock to which the transform is applied using an encoding procedure involving the transform for the second residual subblock; and
   wherein, when the current block is a chroma block, the encoding of the transform skip information comprises:
   p1 deriving, from the maximum size information, a maximum size about a chroma block to which the transform skip mode is applicable based on a chroma sampling format of the video data; and
   encoding the transform skip information for the current block based on comparing the derived maximum size with a width and a height of the current block.

8. A method for transmitting a bitstream containing encoded video data, the method comprising:
   generating the bitstream by encoding video data; and
   transmitting the bitstream to a video decoding apparatus,
   wherein generating the bitstream comprises:
   encoding, into a sequence parameter set (SPS) of a bitstream, one or more high-level syntax elements for indicating maximum size information about a block to which a transform skip mode is applicable;

encoding transform skip information associated with a current block based on the maximum size;

in response to encoding the transform skip information indicating that at least one subblock for which transform is skipped and at least one subblock to which transform is applied are included in the current block, encoding a first residual subblock for the subblock for which the transform is skipped using an encoding procedure not involving transform for the first residual subblock, and encoding a second residual subblock for the subblock to which the transform is applied using an encoding procedure involving the transform for the second residual subblock; and wherein, when the current block is a chroma block, the encoding of the transform skip information comprises:

deriving, from the maximum size information, a maximum size about a chroma block to which the transform skip mode is applicable based on a chroma sampling format of the video data; and encoding the transform skip information for the current block based on comparing the derived maximum size with a width and a height of the current block.

* * * * *